US006828060B2

(12) United States Patent
Zavilenski

(10) Patent No.: US 6,828,060 B2
(45) Date of Patent: Dec. 7, 2004

(54) SAFETY BATTERY

(76) Inventor: Anthony L. Zavilenski, 42760 Trail Blaze Pass, Murrieta, CA (US) 92562

( * ) Notice: Subject to any disclaimer, the term of this patent is extended or adjusted under 35 U.S.C. 154(b) by 287 days.

(21) Appl. No.: 10/217,232

(22) Filed: Aug. 9, 2002

(65) Prior Publication Data
US 2003/0035994 A1 Feb. 20, 2003

Related U.S. Application Data
(60) Provisional application No. 60/313,000, filed on Aug. 16, 2001.

(51) Int. Cl.$^7$ ......................... H01M 2/004; H01M 2/006
(52) U.S. Cl. .................... 429/121; 429/96; 429/164; 429/175
(58) Field of Search .......................... 429/121, 96, 98, 429/162, 164, 175, 178, 179

(56) References Cited

U.S. PATENT DOCUMENTS

| 3,954,505 | A | * | 5/1976 | Anderson | 429/158 |
| 4,366,213 | A | * | 12/1982 | Tamminen | 429/110 |
| 4,459,645 | A | * | 7/1984 | Glatter | 362/104 |
| 5,140,840 | A | * | 8/1992 | Miceli | 63/12 |
| 6,382,815 | B1 | * | 5/2002 | Klearman et al. | 362/253 |
| 6,419,649 | B1 | * | 7/2002 | Klein | 601/70 |

* cited by examiner

Primary Examiner—Gregg Cantelmo
(74) Attorney, Agent, or Firm—Mary Jo Redman; Calif Tervo

(57) ABSTRACT

Safety battery (10) includes cathode (21) and attached cover (15) that enclose anode (41). Cover (15) includes via (16) for providing access to anode (41). Anode (41) is protected by penetrable insulation medium (48). Battery (10) is used to power illuminated jewelry (60) for lip, tongue, or ear without danger of shock or burn to user, even if accidentally swallowed 15 Claims, 2 Drawing Sheets

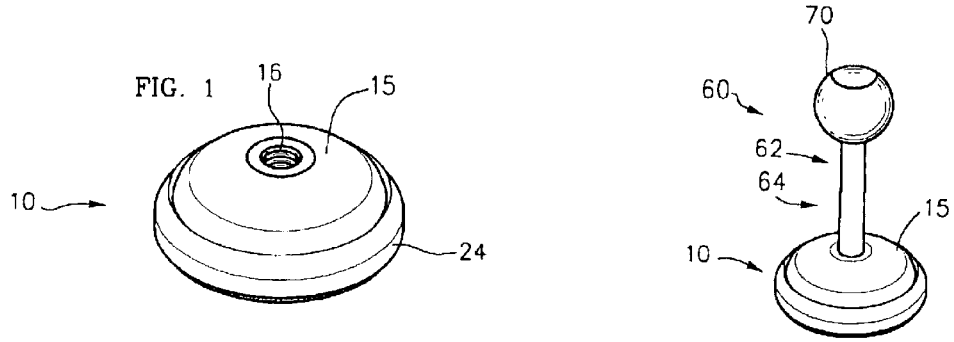
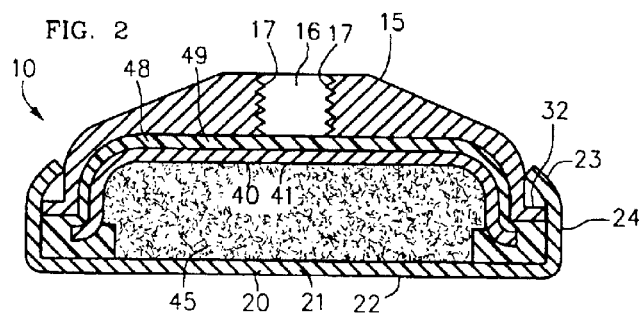
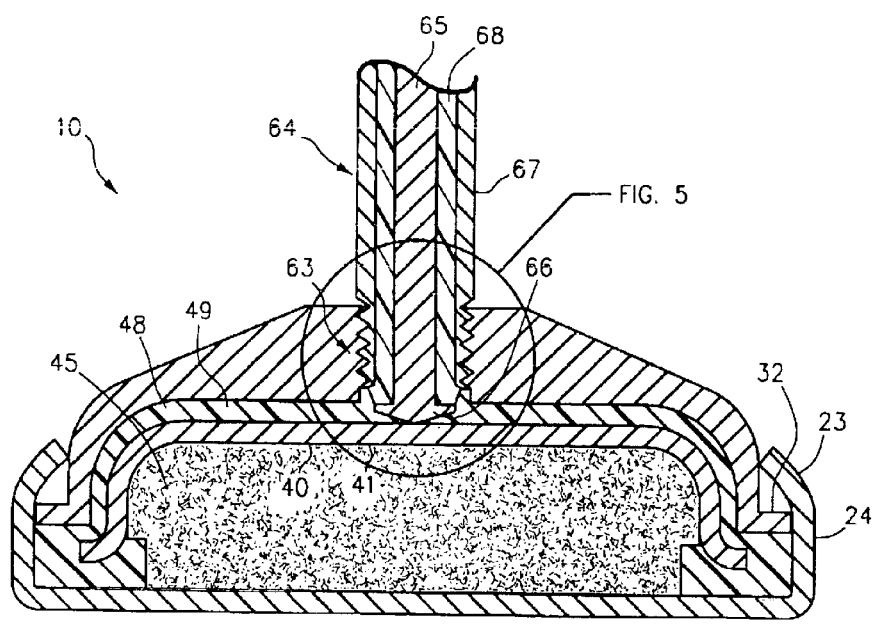

SAFETY BATTERY

CROSS-REFERENCE TO RELATED APPLICATIONS

This application claims the benefit of U.S. Provisional Application No. 60/313,000, filed Aug. 16, 2001.

FIELD OF THE INVENTION

This invention relates to the field of batteries, and more specifically to a button type battery that is safer for close contact with a person's skin.

BACKGROUND OF THE INVENTION

Illuminated jewelry is well-known, such as earrings that include small colored lights, such as light-emitting diodes, or LEDs Such jewelry is typically powered by a small battery or pack of multiple batteries.

Frequently, the jewelry is attached to the battery by long wires and the battery is attached to the person remotely from the jewelry, such as to a belt. The use of wires is acceptable for some items of jewelry, such as a brooch or necklace, but not for others, such as earrings or a tongue stud.

A "button" battery, a small disc-shaped battery, typically employs the two flat faces of the disc as the contacts of opposite polarity. Because button batteries are small and relatively lightweight, they are obvious choices for jewelry mounted directly to the battery, so as to avoid long wires. For example, a tongue stud could be welded to one contact face of the battery. The stud could be inserted into a pierced tongue from below, the battery thus serving as the backing, and an illuminated decoration could attached from the front.

A problem with using a button battery in such a way is the risk of shock or burn to the person wearing the jewelry. The battery could corrode and short out after exposure to saliva or, if swallowed by mistake, to stomach acid. Even if used for an earring or other jewelry not worn in the mouth, a standard button battery can burn or shock a person. When a standard button battery does fail by shorting, the short is typically between points on the case.

There is a need for a battery that is safer than the well-known button battery to be used for jewelry or other devices used in close contact with the skin or mouth.

There is a need for a battery that is more resistant to corrosion, even if swallowed. There is a need for a battery that does not have the potential to burn skin if it shorts out Such a battery preferably would retain the small size, light weight, and smooth surfaces of a standard button battery.

SUMMARY OF THE INVENTION

This invention is a battery that is well suited for wearing on a person's body to power illuminated jewelry or other small devices. The battery of the present invention is similar to a standard button battery in its appearance and shape The present battery includes electrodes of opposite polarities, with one of the electrodes being enclosed within the case of the battery If the battery should fail by shorting between the electrodes, the short is inside the case and thus remote from the body.

In a preferred embodiment, the battery includes a bottom electrode, for example a cathode, forming the bottom face of the battery. The electrode of opposite polarity, for example an anode, is spaced above the cathode and the intervening space is filled with an electrolyte medium, such as a moist paste containing mobile ions A cover encloses the electrolyte and the anode. The edge of the cover is attached to a lip on the periphery of the cathode to form a sealed can In one preferred embodiment, the cover is metal and electrically conductive, thus the cover serves as an extension of the cathode.

To allow the jewelry or other device to contact both electrodes, a small via passes through the cover, providing access to the anode The device to be operated by the battery preferably includes a co-axial stem conductor that can attach to the via The co-axial stem conductor has an internal rod that has a pointed tip, within a co-axial external tube that terminates above the tip of the internal rod. The internal rod and external tube are electrically isolated by insulation.

The illuminated jewelry is mounted onto the safety battery of the present invention by inserting the stem conductor into the via In a preferred embodiment, the via and the stem conductor have compatible threads for secure mounting.

The exposed tip of the internal rod contacts the anode when the jewelry is mounted in a fully engaged position in the via and the shorter external tube contacts the cover, which is at the same potential as the cathode.

A penetrable insulation medium isolates the anode from the cover The insulation medium prevents electrical shorting between the cover and anode and provides corrosion protection for the internal part of the battery The tip of the stem conductor penetrates the insulation medium to contact the anode.

When the jewelry is removed, the penetrable insulation "heals", or closes on itself to seal the anode from corrosion. By protecting the anode from corrosion, the reliability and lifetime of the battery are increased. If the battery is accidentally swallowed, potentially toxic corrosion products are not released into the stomach.

Thus, the battery of the present invention is a safe and reliable means for powering small devices worn on the person, such as illuminated jewelry. The battery is designed such that it will not shock, burn, or poison a person, as other batteries can.

Other features and advantages of the invention will become more apparent upon a reading of the following detailed description, together with the drawings in which like reference numerals refer to like parts throughout.

BRIEF DESCRIPTION OF THE DRAWINGS

FIG. 1 is a perspective view of the battery of the present invention.

FIG. 2 is a side sectional view of the battery of FIG. 1.

FIG. 3 is a perspective environmental view of a preferred embodiment of the safety battery of the present invention with an illuminated jewelry device mounted.

FIG. 4 is a side sectional view, partly cut away, of the battery and mounted jewelry device of FIG. 3.

DETAILED DESCRIPTION OF THE INVENTION

Figure 5:
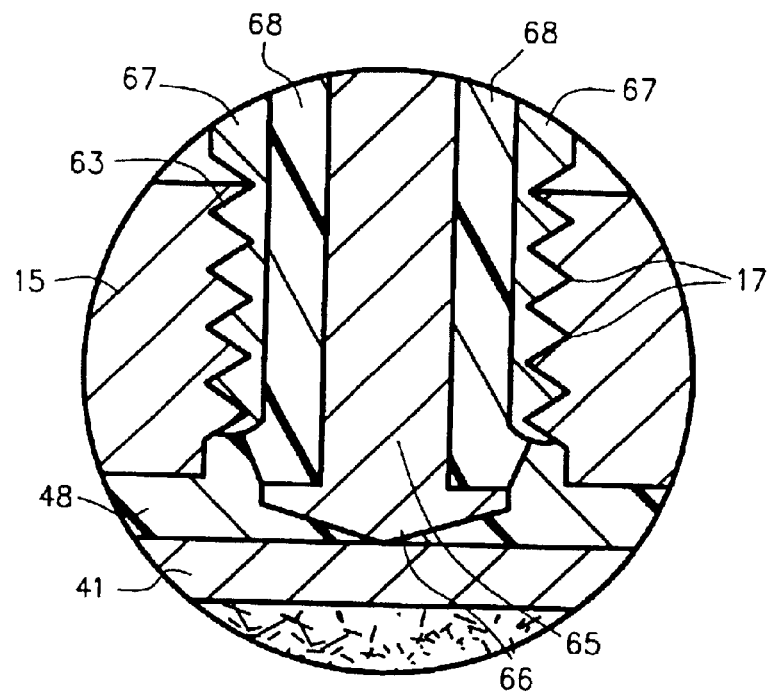
FIG. 5 is an enlarged view of detail 5 of FIG. 4.
Figure 6:
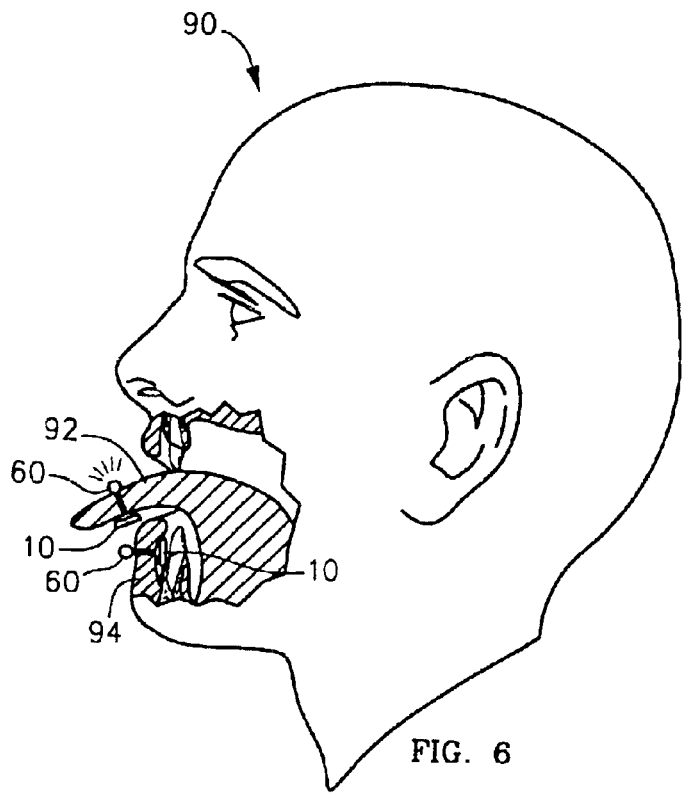
FIG. 6 is a side view, partly cut away, of a person wearing lip and tongue illuminated jewelry mounted on the battery of the present invention.

FIG. 1 is a perspective view of the battery 10 of the present invention. FIG. 2 is a sectional view of battery 10 of FIG. 1.

Battery 10 generally includes a bottom electrode 20, such as cathode 21, an opposite electrode 40, such as anode 41, and a cover 15. Cover 15 includes via 16 for providing access for electrical contact with anode 41. Cathode 21 includes a bottom face 22 and a periphery 23, such as side wall 24. Side wall 24 is attached to bottom face 22 so as to form a cup shape that forms the base of the battery.

In the preferred embodiment of FIG. 1, side wall 24 is attached to peripheral lip 32 of cover 15, such as by welding or crimping Cover 15 is preferably of electrically-conductive metal, so joining peripheral lip 32 to side wall 24 by crimping or welding causes cover 15 to be at the same electrical potential as cathode 21 Cover 15 thus may be considered as functioning as part of the cathode structure for battery 10 of FIG. 1. Cover 15 can be considered as being an upper cathode 30. All of the exposed metal on the exterior of battery 10 is at the same potential and thus will not shock or burn a person.

For battery 10 to be usable for powering an electrical device, an electrode of opposite potential must be available. Via 16 penetrates cover 15 and provides access to opposite electrode 40, such as anode 41.

Anode 41 is spaced above cathode 21. Electrolyte medium 45, such as a moist paste containing mobile metallic ions, is disposed between anode 41 and cathode 21, as is well known. There is a gap between anode 41 and cover 15.

An electrically-powered device may be connected to the two electrodes 21, 41 of battery 10 by various means, including a fine wire (not shown) pushed into via 36 to contact anode 41 and another wire (not shown) attached to bottom face 22 or cover 15. More typically, the device to be powered by battery 10 includes a conductor adapted for being attached to via 16.

FIG. 3 is a perspective environmental view of a preferred embodiment of safety battery 10 with an illuminated jewelry device 60 mounted. FIG. 4 is a sectional view, partly cut away, of battery 10 and mounted jewelry device 60 of FIG. 3 FIG. 5 is a side view, partly cut away, of a person 90 wearing illuminated jewelry 60 mounted on battery 10 on tongue 92 and lip 94.

Jewelry 60 includes stem conductor 62, adapted to mount in via 16. Stem conductor 62 as shown in FIGS. 3 and 4 is a co-axial conductor 64. An alternative stem conductor is a unitary conductor for contacting anode 41, in which case jewelry 60 includes a second conductor, such as a wire (not shown) for contacting cathode 21.

Co-axial stem conductor 64 includes conductive inner rod 65 and conductive outer tube 67. Inner rod 65 has a free end, such as pointed tip 66. Outer tube 67 surrounds inner rod 65 but terminates above tip 66 An insulator 68 is between inner rod 65 and outer tube 67 and electrically isolates them from each other. Methods of making co-axial conductors are well known in the art and may include co-extrusion or rolling together of different materials.

In the preferred embodiment depicted FIG. 5, inner rod 65 is formed of wire, in a similar manner in which a headed pin is formed. Tip 66 has been formed by deformation of the wire, by which tip 66 has a diameter greater than that of the original wire. The diameter of tip 66 is greater than the diameter of outer tube 67 in the embodiment shown in FIG. 5.

Jewelry 60 also includes an ornament, such as LED 70, attached to co-axial stem conductor 64. Depending on the intended use of jewelry 60, stem conductor 64 is typically as long as the thickness of a lip, tongue, earlobe, or other pierced body part. Other types of electrical devices envisioned as worn attached to the body include jewelry that includes a "voice chip," a fragrance emitter, or a camera lens.

Jewelry 60 is mounted on battery 10 by inserting stem conductor 64 into via 16 Via 16 typically includes attachment means for securing stem conductor 64, such as internal threads 17 that mate with opposite exterior threads 63 on stem conductor 64. Via 16 could alternatively be adapted in size and shape to provide a friction attachment of stem conductor 64

The length of stem conductor 64 is preferably such that tip 66 of inner rod 65 reaches and contacts anode 41. Because outer tube 67 terminates above tip 66, outer tube 67 extends only far enough to contact the interior of via 36. The interior of via 36 is at the same potential as cathode 21, therefore jewelry device 60 has a complete circuit with battery 10 and battery 10 is available for powering some function of jewelry 60, such as illuminating LED 70.

A penetrable insulation medium 48 is above anode 41 In a preferred embodiment, insulation medium 48 comprises a layer of a "self-healing" polymer 49, such as a silicone gel Polymer 49 must be of a material that is in electrical insulator and that can "heal" a hole that is poked through it. Silicone gel, for example, does not flow as a liquid, yet if a sharp object, such as tip 66, is pushed through the gel then removed, the gel falls back together and closes the hole completely.

Tip 66 penetrates polymer 49 to make contact with anode 41 Polymer 49 excludes moisture and chemicals, such as saliva or stomach acid, from corroding anode 41 or causing a short between anode 41 and cathode 21.

Penetrable insulation medium 49 may, alternatively, be a layer of air. It has been found that a via 16 of appropriate small size for body jewelry typically excludes liquid water from entering. The precise dimensions of a via 16 that excludes water depend on the wettability of the material used to form cover 16 and the surface tension of the water, that is, the purity of the water; therefore each design using air as the insulation medium 48 should be tested under all possible conditions of use.

Although the bottom electrode 20 has herein been illustrated and described as cathode 21 and the opposite electrode 20 has been described as anode 41, the positions could equally well be reversed. The bottom face of battery 10 would in that case be anode 41 and the opposite electrode 40 would be cathode 21. All other references would also be reversed, such as tip 66 of stem conductor 62 would contact cathode 21.

From the foregoing description, it is seen that the battery of the present invention provides a safe, reliable power source for small electrical devices, such as jewelry devices including active functions such as illumination or sound.

The invention has been shown and described with reference to certain specific embodiments, however, it is to be understood that modifications and substitutions can be made by a person skilled in the art, without departing from the spirit and scope thereof

I claim:

1. A battery device including
   a bottom electrode of a first polarity, including
      a bottom; and
      a periphery;
   an opposite electrode of a second polarity spaced above said bottom electrode,
   an electrolyte medium between said bottom electrode and said opposite electrode for allowing a voltage difference between said electrodes;
   a cover spaced above said opposite electrode; including:

a peripheral lip; said peripheral lip attached to said periphery of said bottom electrode so as to enclose said opposite electrode; and a via for providing access for a conductor of an electrically-powered device to have electrical contact with said opposite electrode; and a penetrable insulating medium between said cover and said opposite electrode.

2. The battery device of claim 1, said via including attaching means for attaching the conductor of an electrically-powered device.

3. The battery device of claim 2, said attaching means comprising threads for receiving a compatibly-threaded conductor of an electrically-powered device.

4. The battery device of claim 1, said cover being non-conductive of electricity.

5. The battery device of claim 1, said cover being conductive of electricity, said peripheral lip electrically connected to said periphery of said bottom electrode.

6. The battery device of claim 1, said penetrable insulating medium comprising air.

7. The battery device of claim 6, wherein said via is sized such that water does not enter said via at standard atmospheric pressure.

8. The battery device of claim 1, said penetrable insulating medium comprising self-healing polymer.

9. In combination:

a battery device including:
   a bottom electrode of a first polarity, including
      a bottom; and
      a periphery;
   an opposite electrode of a second polarity spaced above said bottom electrode,
   an electrolyte medium between said bottom electrode and said opposite electrode for allowing a voltage difference between said electrodes,
   a cover spaced above said opposite electrode; including:
      a peripheral lip; said peripheral lip attached to said periphery of said bottom electrode so as to enclose said opposite electrode; and
      a via for providing access for a conductor of an electrically-powered device to have electrical contact with said opposite electrode, and
   a penetrable insulating medium between said cover and said opposite electrode, and an electrically-powered device including:
   an elongate stem conductor for receiving electricity from a battery said elongate stem conductor adapted for passage through said via and said insulating medium and for making electrical contact with said opposite electrode.

10. The combination of claim 9, said stem conductor including
   an inner conductor rod;
   an outer conductor tube generally surrounding said inner conductor rod; and
   insulation between said inner conductor rod and said outer conductor tube to prevent electrical contact therebetween.

11. The combination of claim 10, wherein: said cover is conductive of electricity; and said peripheral lip is electrically connected to said periphery of said bottom electrode;
   said inner conductor rod including an exposed tip; and
   said outer conductor rod terminating above said exposed tip; such that when said stem conductor is engaged in said via, said tip is in electrical contact with said opposite electrode and said outer conductor rod is in electrical contact with said top electrode.

12. The combination of claim 11, said insulating medium between said cover and said opposite electrode comprising:
   self-healing polymer; and said tip being adapted such that said tip penetrates said polymer when engaged in said via so as to provide electrical connection between said opposite electrode and said inner conductor rod.

13. The combination of claim 11, said insulating medium between said cover and said opposite electrode comprising air; and said via being sized such that water does not enter said via at standard atmospheric pressure.

14. The combination of claim 11, said via including
   attaching means for attaching said stein conductor; and
   said stem conductor including:
      an attached electrical device;
   said cover and said attaching means adapted for supporting said stem conductor and said attached electrical device.

15. The combination of claim 14, said attaching means comprising:
   internal threads for receiving a compatibly-threaded stem conductor.

* * * * *